Sept. 22, 1959     J. W. OEHRLI     2,905,026
VARIABLE RATIO TRANSMISSION

Filed June 27, 1958     3 Sheets-Sheet 1

JOHN W. OEHRLI,
INVENTOR.
WHANN & McMANIGAL
Attorneys for Applicant

Sept. 22, 1959 J. W. OEHRLI 2,905,026
VARIABLE RATIO TRANSMISSION
Filed June 27, 1958 3 Sheets-Sheet 2

JOHN W. OEHRLI,
INVENTOR.
WHANN & McMANIGAL
Attorneys for Applicant

Sept. 22, 1959  J. W. OEHRLI  2,905,026
VARIABLE RATIO TRANSMISSION
Filed June 27, 1958  3 Sheets-Sheet 3

JOHN W. OEHRLI,
INVENTOR.
WHANN & McMANIGAL
Attorneys for Applicant

United States Patent Office 2,905,026
Patented Sept. 22, 1959

2,905,026

VARIABLE RATIO TRANSMISSION

John W. Oehrli, Pacific Palisades, Calif., assignor to McCulloch Corporation, Los Angeles, Calif., a corporation of Wisconsin Application June 27, 1958, Serial No. 745,215

10 Claims. (Cl. 74—796)

This invention relates to superchargers for internal combustion engines, such as employed in automotive vehicles, and relates in particular to a supercharger having a variable ratio ball type transmission for transmitting rotation from the engine drive shaft to the impeller of the supercharger.

It is an object of the invention to provide a supercharger drive having three phases of operation consisting of cruising range, high blower range and automatic governing to prevent excessive boost pressure.

It is an object of the invention to provide a variable speed supercharger drive having control means hydraulically operated by oil received under pressure from the regular crankcase pressure lubricating system of the engine.

It is a further object of the invention to provide a device of this character wherein automatic high pressure limitation is accomplished by means of a control valve mechanism responsive to boost pressure taken from the discharge throat of the supercharger.

It is a further object of the invention to provide a supercharger drive mechanism wherein the change of speed ratio between the driving and driven shafts is accomplished through radial displacement of the drive balls of a planetary ball type transmission.

A further object of the invention is to provide a variable speed transmission for a supercharger having inner and outer ball races between which the balls roll, each of these races consisting of a pair of race rings, the race rings of each pair being axially movable toward and away from each other, but in opposite relation, there being means for forcing the inner race rings relatively toward each other by application of a force which increases as the inner race rings are moved relatively toward each other and decreases as the race rings separate.

In the present invention the outer race rings are moved relatively toward each other by application of a force under control of the pressure of the air discharged by the supercharger. Also, the arrangement is such that centrifugal force acting in the balls assist in the prevention of overspeeding of the supercharger impeller.

Further objects and advantages of the invention may be brought out in the following part of the specification wherein the purpose of the explanation of details is to make a complete disclosure without, however, limiting the scope of the invention which is set forth in the appended claims.

Referring to the accompanying drawings which are for illustrative purposes only:

Figure 1:
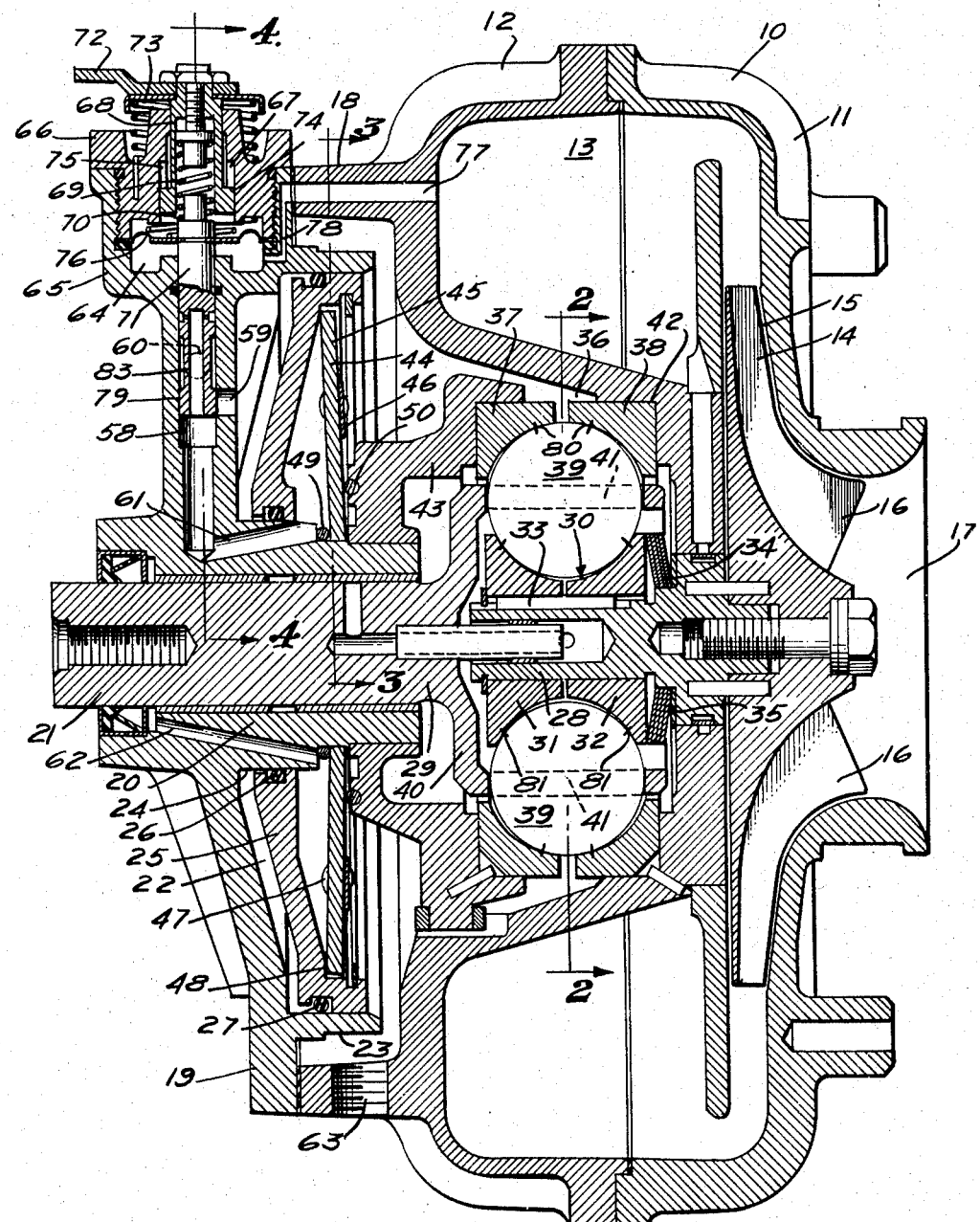
Fig. 1 is a longitudinal cross section through a preferred form of the invention.
Figure 2:
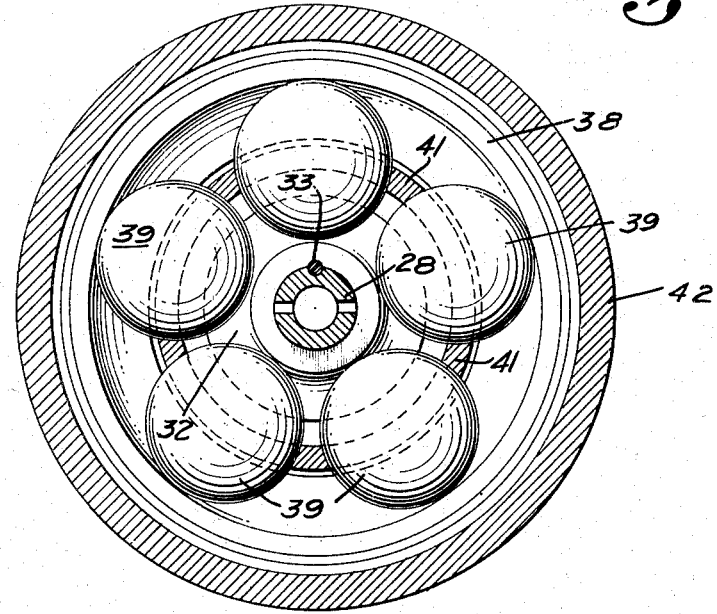
Fig. 2 is a fragmentary cross section taken as indicated by the line 2—2 of Fig. 1.

In Fig. 1, I show a supercharger housing 10 having cooperating front and rear parts 11 and 12 defining an annular air discharge passage 13 which receives compressed air from an impeller 14 which revolves in an impeller chamber 15 within the front housing part 11. The impeller 14 has radial vanes 16 which draw air in through the centrally located inlet port 17 of the front housing part 11.

The rear housing part 12 has an annular wall 18 to which an end plate 19 is secured. This end plate 19 has a hub 20 which supports a drive shaft 21 in axial alignment with the inlet opening 17. It also includes an annular cylinder 22 comprising an outer cylindrical wall 23 and an inner cylindrical wall 24 surrounding the hub 20. An annular piston 25, having inner and outer sealing rings 26 and 27 is axially movable in the cylinder 22 by means which will be hereinafter described.

A driven shaft 28 is disposed at the inner end 29 of the drive shaft 21. This driven shaft 28 has the impeller 14 fixed on its outer (rightward) end, and adjacent its inner end supports an inner ball race 30 consisting of two cooperating race rings 31 and 32, prevented from rotation relative to the shaft 28 by a key 33. The race ring 32 is movable axially on the shaft 28 toward the ring 31 and negative rate spring means 34 are disposed between the race ring 32 and a shoulder 35 on the shaft 28 for urging the race ring 32 toward the race ring 31.

The transmission includes an outer ball race 36 consisting of outer race rings 37 and 38 supported so that the race ring 37 may be moved axially toward the race ring 38. Spherical balls 39 are disposed between the inner and outer races 30 and 36 and are adapted to roll therein. On the inner end 29 of the drive shaft 21 there is a radial wall 40 carrying fingers 41 which project into the spaces between the balls 39 so that rotation of the drive shaft 21 will cause the fingers 41 to bear against the balls 39 and cause them to roll within the outer race 36 and to transmit rotation to the inner race ring 30, thereby driving the shaft 28 and the impeller 14 at a speed greater than the speed of rotation of the shaft 21.

Figure 3:
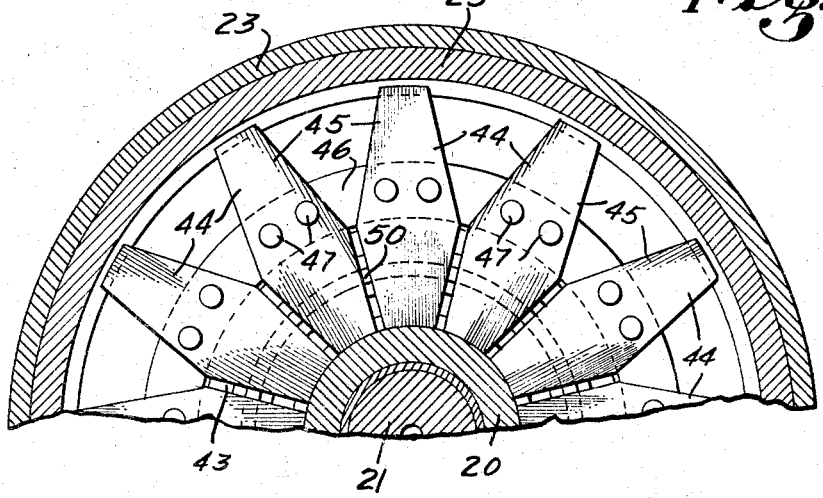
Fig. 3 is a fragmentary sectional view taken as indicated by the line 3—3 of Fig. 1.

The outer race ring 38 is supported by a wall 42, and the outer race ring 37 is supported in axial alignment with the race ring 38 by an annular member 43 which is axially movable through a limited distance on the inner end of the hub 20. A compound lever element 44 is positioned between the piston 25 and the annular member 43 for transmitting rightward movement of the piston 25 to forcibly move the race ring 37 toward the race ring 38. As shown in Fig. 3, this lever element 44 comprises a plurality of radially extending levers 45 arranged in a circle around the portion of the hub 20 adjacent the leftward end of the annular member 43, and being secured to a metal ring 46 by means shown as rivets 47. The outer ends of the levers 45 engage a shoulder 48 on the piston 25 near its periphery. The inner ends of the levers 45 engage a stationary ring 49 surrounding the hub 20, and each lever 45 near its inner end, engages a ring 50 supported in the leftward face of the annular member 43, this ring 50 providing a shoulder or fulcrum engaging intermediate portions of the levers 45. The portions of the levers 45 engaged by the fulcrum member 50 are relatively close to the inner ends of the levers, so that the force applied to the race ring 37 to move the same rightwardly will be a multiple of the force applied by the piston 25 to the outer ends of the levers 45.

Figure 4:
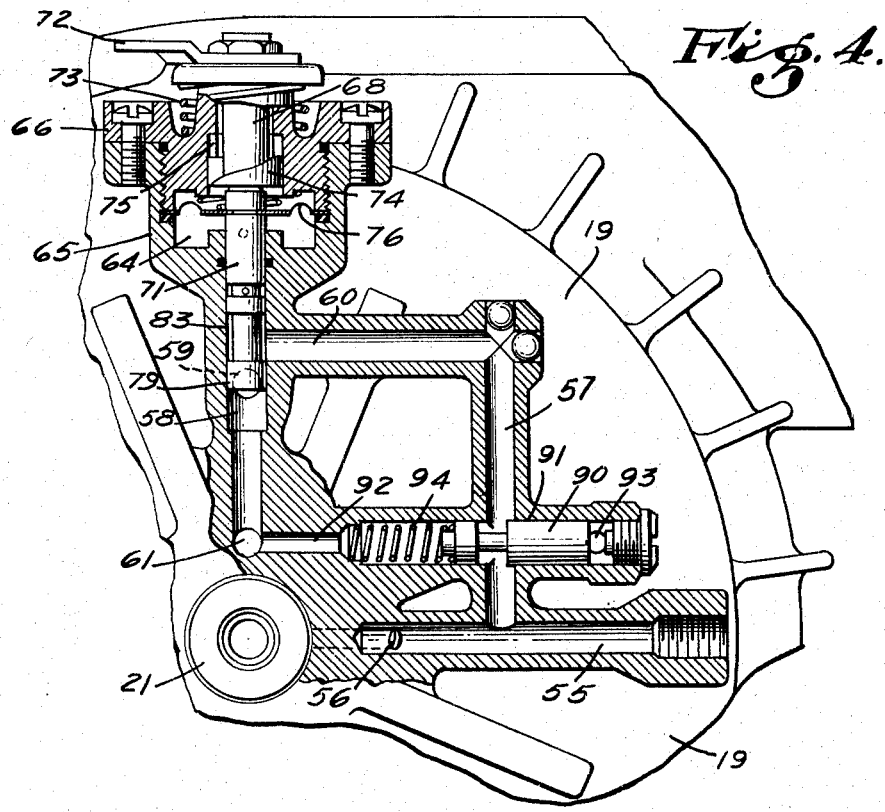
Fig. 4 is a fragmentary sectional view, to enlarged scale, taken as indicated by the line 4—4 of Fig. 1 to show the details of air pressure responsive control of the invention.

The piston 25 is moved rightwardly by controlled oil pressure derived from the internal lubricating system of the internal combustion engine with which the supercharger is employed, or any other source of oil under pressure. As shown in Fig. 4, the end plate 19 has therein an oil inlet passage 55, the inner end of which is connected by a duct 56 with the bearing space of the hub 20. From the passage 55 an oil supply passage 57 extends to a vertical valve bore 58 from which a port 59 extends into communication with the interior of the cylinder 22, behind the piston 25. The oil supply passage 57 communicates with the valve bore 58 through a port 60 which is spaced upwardly a short distance above the port 59. The lower end of the valve bore 58 is connected to a drain passage 61 which extends through the hub 20 to the space around the hub between the piston 25 and the compound lever element 44. Also, an oil drain passage 62 connects the outer end of the bearing space of the hub with the space between the piston 25 and the lever element 44. The oil which drains into this space is carried off through a drain opening 63.

At the upper end of the valve bore 58 there is a diaphragm chamber 64 defined by a cylindrical wall 65 which is threaded so as to receive a plug or closure 66 having axially therethrough a stepped bore 67 in which a control shaft 68 is operative. A compression spring 69 extends within the control shaft and its lower end engages the upper end 70 of a slide valve 71 which extends downwardly into the valve bore 58. A lever 72 is fixed on the upper end of the control shaft 68 and provides a means whereby the control shaft 68 may be rotated against the torque of a return spring 73 which is effective to return the control shaft 68 to its original position when force against the lever 72 is released. The control shaft 68 has on its lower end a cam 74 of helical form which engages a cooperating shoulder 75 in the stepped bore 67, this cam 74 causing the control shaft 68 to move downward from the position in which it is shown in Fig. 4 to the position thereof shown in Fig. 5, in response to suitable rotation of the control shaft 68 by swinging the lever 62 in clockwise direction from the position in which it is shown in Fig. 4. A diaphragm 76 has its inner portion connected to the upper end of the slide valve 71, and has its peripheral portion clamped in place by the lower end of the plug 66.

A diaphragm chamber 64, below the diaphragm 76 communicates with the outlet chamber or passage 13 of the supercharger through a passage 77 in the annular wall 18 of the housing part 12 and a passage 78 in the upper portion of the end plate 19, as shown in Fig. 1. Therefore, the air pressure in the outlet passage 13 is transmitted to the lower face of the diaphragm, applying a force tending to raise the valve 71. When the control shaft 68 is in its initial, raised position, as shown in Fig. 4, relatively low air pressure in the diaphragm chamber 64 will hold the valve 71 in its raised position wherein the cylindrical section 79 on the lower end of the valve 71 will be disposed between the ports 59 and 60 so that fluid under pressure from the passage 57 cannot flow into the cylinder 22 to move the piston 25 rightwardly. This is the cruising range position of the control valve wherein the outer race rings 37 and 38 are separated to their fullest extent and the negative rate springs 17 urge the race ring 32 toward the race ring 31, forcing the balls 39 outwardly so that the outer portions of the balls engage the race rings at substantially the points 80; whereas the inner portions of the balls engage the inner race rings 31 and 32 at the points 81. The balls 39 and the cooperating race rings are at this time positioned for the lowest ratio of the transmission whereby the drive shaft 21 drives the impeller shaft 28. The speed of rotation of the impeller 14 will, at this time, vary in direct proportion to the change in speed of the driving shaft 21 which is driven by the engine.

Figure 5:
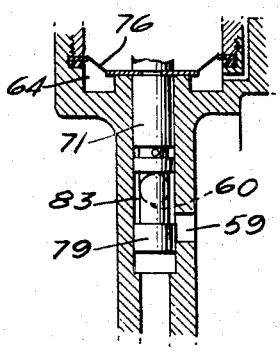
Fig. 5 is a fragmentary schematic view showing another position of the control valve.
Figure 6:
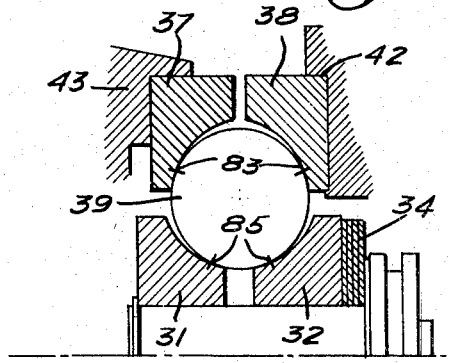
Fig. 6 is a fragmentary sectional view showing a different adjustment of the race rings.

When a high pressure range of operation of the supercharger is desired, the lever 72 is rotated in clockwise direction from the position in which it is shown in Fig. 4, causing the control shaft 68 to descend. As shown in Fig. 5, the downward movement of the spring 69 will force the valve 71 downwardly into a position wherein its external annular passage 83 will connect the ports 60 and 59, whereupon oil under pressure may flow from the passage 57 into the cylinder 22, to move the piston 25 toward the lever element 44. This will swing the outer portions of the radial levers 45 toward the annular member 43, moving the member 43 and the race ring 37 toward the race ring 38. This will have the effect of displacing the balls 39 inwardly and separating the inner races 31 and 32, as shown in schematic Fig. 6, at which time the inner portions of the balls 39 will engage the inner races 31 and 32 at the points 83 which are closer to the axis of rotation of the impeller shaft 28 than the points 81. The outer portions of the balls 39 will engage the outer races 37 and 38 at points 85 displaced from the points 80, indicated in Fig. 1. The ball transmission is now in its high ratio range of transmission, and the speed of rotation of the impeller 14 will be greatly increased in proportion to the speed of rotation of the drive shaft 21, resulting in a marked increase in the volume of air moved by the impeller 14, accompanied by an increase in pressure in the outlet passage 13 of the supercharger. This will result in an increase in pressure against the lower face of the diaphragm 76 tending to raise the valve 71 against the downward force of the spring 69, and when the exerted force against the diaphragm becomes greater than the resistance offered by the spring 69, it will yield upwardly allowing the diaphragm to raise the valve 71 so that the cylindrical portion 79 on the lower end thereof will shut off the flow of oil from the port 60 to the port 59, and also bring the port 59 into communication with the drain passage 61 so that oil will flow out of the cylinder 22, permitting the piston 25 to move away from the annular member 43 so that the negative rate springs 34 can move the inner race ring 32 toward the race ring 31, urging the balls 39 outwardly. This outward urging of the balls 39, in conjunction with the centrifugal force acting in the balls effects a radially outward movement of the balls which results in separation of the outer races, so that the outer race 37 is moved leftwardly toward the position in which it is shown in Fig. 1. As the drive balls move outwardly they contact the inner and outer races at intermediate points between the maximum high and low ratios so that a reduction in speed ratio results and the output boost pressure is held constant because, as soon as pressure reduces in the outlet passage 13 and in the diaphragm chamber 64, the spring 69 will move the valve 71 downwardly so as to close the port 59, thereby trapping oil in the cylinder 22 and maintaining the piston 25 in a position which will produce a required driving ratio in the ball transmission. The governing action, to maintain a safe speed of rotation of the impeller 14 and likewise a constant level of output pressure will continue until the control lever is returned to its initial position, or until the engine speed is reduced to a lower level whereat no limitation of maximum conditions of operation is required.

Excessive pressure between the balls and the race rings of the transmission is prevented by the overload control shown in Fig. 4. A fluid pressure actuated valve 90 is adapted to close the oil inlet passage 57 when the pressure of oil in the cylinder 22 reaches a maximum safe value, thereby preventing increase in the force which the piston 25 exerts in rightward direction to force the race ring 37 toward the race ring 38. The valve 90 is slidable in a bore 91, which intersects the passage 57. One end of this bore 91 communicates through a passage 92 with the outlet duct 61 and the opposite end of the bore 91 communicates through an opening 93 in the end of plate 19 with an interior space of the cylinder 22. The valve 90 is urged toward the position of which it is shown in Fig. 4 by a spring 94. As pressure within the cylinder 22 increases, such increase in pressure will be transmitted through the passage 93 to the end of the valve 90 opposite the spring 94 and will move the valve 90 leftwardly, the passage 57 being completely obstructed when the predetermined maximum for fluid pressure in the cylinder 22 is reached. The closing of the passage 57 inhibits further increase in the pressure of oil which may be fed into the cylinder 22.

I claim:

1. In a high speed variable ratio transmission: a power input shaft; a power output shaft; inner race means on one of said shafts comprising inner race rings and means for urging them toward each other; outer race means supported in a position around said inner race means, comprising outer race rings supported so as to be movable relatively toward each other; balls disposed between said inner and outer race means in rolling engagement with said race rings thereof; means for controlling the positions of said balls; and means for urging said outer race rings toward each other, comprising walls forming a fluid receiving chamber, one of said walls being movable by the pressure of said fluid, means connecting said movable wall to said outer race means so as to move the last named rings thereof toward each other, means for delivering fluid under pressure to said chamber from a source of fluid under pressure, and means for limiting the pressure of said fluid in said chamber.

2. In a high speed variable ratio transmission: a power input shaft; a power output shaft; inner race means on one of said shafts comprising inner race rings and means for urging them toward each other; outer race means supported in a position around said inner race means, comprising outer race rings supported so as to be movable relatively toward each other; balls disposed between said inner and outer race means in rolling engagement with said race rings thereof; means for controlling the positions of said balls; and means for urging said outer race rings toward each other, comprising walls forming a fluid receiving chamber, one of said walls being movable by the pressure of said fluid, means connecting said movable wall to said outer race means so as to move the last named rings thereof toward each other, means for delivering fluid under pressure to said chamber from a source of fluid under pressure, a control valve for controlling the flow of fluid into said chamber, and pressure regulating valve means for limiting the pressure of said fluid in said chamber.

3. In a high speed variable ratio transmission: a power input shaft; a power output shaft; inner race means on one of said shafts comprising inner race rings and means for urging them toward each other; outer race means supported in a position around said inner race means, comprising outer race rings supported so as to be movable relatively toward each other; balls disposed between said inner and outer race means in rolling engagement with said race rings thereof; means for controlling the positions of said balls; and means for urging said outer race rings toward each other, comprising walls forming a fluid receiving chamber, one of said walls being movable by the pressure of said fluid, means connecting said movable wall to said outer race means so as to move the last named rings thereof toward each other, a duct member connected to said chamber for delivering fluid thereinto, valve means for the control of fluid flow through said duct means, a pressure responsive element connected so as to be exposed to the pressure of fluid in said chamber, and means connected to said element so as to be actuated thereby, for closing said duct in response to excess pressure in said chamber.

4. In a high speed variable ratio transmission: a power input shaft; a power output shaft; inner race means on one of said shafts comprising inner race rings and means for urging them toward each other; outer race means supported in a position around said inner race means, comprising outer race rings supported so as to be movable relatively toward each other; balls disposed between said inner and outer race means in rolling engagement with said race rings thereof; means for controlling the positions of said balls; and means for urging said outer race rings toward each other, comprising an annular cylinder surrounding the other of said shafts, an annular piston in said cylinder, means connecting said piston to said outer race means so as to move said outer race rings toward each other in response to movement of said piston by fluid pressure in said cylinder, a delivery duct for the delivery of fluid under pressure into said cylinder, control valve means for controlling the flow of fluid through said duct to said cylinder, and auxiliary valve means connected to said cylinder so as to be responsive to fluid pressure therein, for limiting the magnitude of the fluid pressure which may be built up in said cylinder.

5. In a variable ratio transmission: a power input shaft; a power output shaft; a variable ratio transmission connecting said shafts, said transmission having means acting in response to pressure increments to change the ratio thereof from one extreme to the other; and means for applying pressure increments to said pressure responsive means of said transmission comprising an annular cylinder around one of said shafts, an annular piston in said cylinder, means for connecting said piston to said means of said transmission which acts in response to pressure increments, a duct for connecting said cylinder to a source of fluid under pressure, valve means for controlling the flow of fluid through said duct to said cylinder, and means for limiting the pressure of said fluid in said cylinder.

6. In a variable ratio transmission: a power input shaft; a power output shaft; a variable ratio transmission connecting said shafts, said transmission having means acting in response to pressure increments to change the ratio thereof from one extreme to the other; and means for applying pressure increments to said pressure responsive means of said transmission comprising an annular cylinder around one of said shafts, an annular piston in said cylinder, means for connecting said piston to said means of said transmission which acts in response to pressure increments, a duct for connecting said cylinder to a source of fluid under pressure, valve means for controlling the flow of fluid through said duct to said cylinder, and valve means responsive to pressure in said cylinder for closing said duct when a predetermined pressure is built up in said cylinder.

7. In a variable ratio transmission: a power input shaft; a power output shaft; a variable ratio transmission connecting said shafts, said transmission having means acting in response to pressure increments to change the ratio thereof from one extreme to the other; and means for applying pressure increments to said pressure responsive means of said transmission comprising walls forming a fluid receiving chamber, one of the walls of said chamber being movable in response to fluid pressure therein, means connecting said movable wall to said pressure responsive means of said variable ratio transmission, a duct connecting said chamber to a source of fluid under pressure, valve means for controlling the flow of fluid through said duct to said chamber, and means for limiting pressure of fluid in said chamber.

8. In a variable ratio transmission: a power input shaft; a power output shaft; a variable ratio transmission connecting said shafts, said transmission having means acting in response to pressure increments to change the ratio thereof from one extreme to the other; and means for applying pressure increments to said pressure responsive means of said transmission comprising walls forming a fluid receiving chamber, one of the walls of said chamber being movable in response to fluid pressure therein, means connecting said movable wall to said pressure responsive means of said variable ratio transmission, a duct connecting said chamber to a source of fluid under pressure, and a shutoff valve in said duct connected to said chamber so as to be responsive to fluid pressure therein to substantially shut off the flow of fluid through said duct when a predetermined maximum fluid pressure in said chamber is reached.

9. In a variable ratio transmission for a supercharger: a shell; axially arranged bearings in said shell; a power input shaft supported by said bearings; a power output shaft aligned with said input shaft; inner race means on said output shaft comprising inner race rings and means for urging them toward each other; outer race means supported in a position around said inner race means comprising outer race rings supported so as to be moved relatively toward each other; balls disposed between said inner and outer race means in rolling engagement with said race rings thereof; means on said input shaft for causing said balls to roll around said inner race means; a rear end wall for said shell; an annular cylinder supported on the inner face of said end wall surrounding said input shaft; an annular piston in said cylinder; means connecting said piston to one of said outer race rings so as to move it toward the other in response to movement of said piston; a duct for conducting fluid under pressure to said cylinder from a source of fluid under pressure; a control valve for said duct having a valve part for controlling the flow of fluid through said duct and a pressure responsive part connected to the outlet of said supercharger; and means for limiting the pressure of fluid in said cylinder.

10. In a variable ratio transmisison for a supercharger: a shell; axially arranged bearings in said shell; a power input shaft supported by said bearings; a power output shaft aligned with said input shaft; inner race means on said output shaft comprising inner race rings and means for urging them toward each other; outer race means supported in a position around said inner race means comprising outer race rings supported so as to be moved relatively toward each other; balls disposed between said inner and outer race means in rolling engagement with said race rings thereof; means on said input shaft for causing said balls to roll around said inner race means; a rear end wall for said shell; an annular cylinder supported on the inner face of said end wall surrounding said input shaft; an annular piston in said cylinder; means connecting said piston to one of said outer race rings so as to move it toward the other in response to movement of said piston; a duct for conducting fluid under pressure to said cylinder from a source of fluid under pressure; a control valve for said duct having a valve part for controlling the flow of fluid through said duct and a pressure responsive part connected to the outlet of said supercharger; and means for limiting the pressure of fluid in said cylinder comprising a second control valve for said duct having a valve element for changing the flow of fluid through said duct and a pressure responsive element connected to said cylinder so as to be exposed to the pressure of fluid therein, said pressure responsive element acting in response to the pressure of fluid in said cylinder to move said valve element into duct closing position.

No references cited.

Notice of Adverse Decision in Interference

In Interference No. 91,901 involving Patent No. 2,905,026, J. W. Oehrli, Variable ratio transmission, final judgment adverse to the patentee was rendered Aug. 12, 1964, as to claims 1, 2, 4, 5 and 7.
[*Official Gazette December 22, 1964.*]